United States Patent
Kim et al.

(10) Patent No.: US 10,115,495 B2
(45) Date of Patent: Oct. 30, 2018

(54) TRANSPARENT CONDUCTOR AND OPTICAL DISPLAY INCLUDING THE SAME

(71) Applicant: SAMSUNG SDI CO., LTD., Yongin-si, Gyeonggi-do (KR)

(72) Inventors: Do Young Kim, Uiwang-si (KR); Young Kwon Koo, Uiwang-si (KR); Dong Myeong Shin, Uiwang-si (KR); Hyoung Tae Lim, Uiwang-si (KR); Oh Hyeon Hwang, Uiwang-si (KR); Kyoung Ku Kang, Uiwang-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 647 days.

(21) Appl. No.: 14/517,725

(22) Filed: Oct. 17, 2014

(65) Prior Publication Data
US 2015/0111048 A1  Apr. 23, 2015

(30) Foreign Application Priority Data
Oct. 17, 2013 (KR) ........................ 10-2013-0124260

(51) Int. Cl.
*H01B 1/22* (2006.01)
*C09B 67/22* (2006.01)

(52) U.S. Cl.
CPC ........... *H01B 1/22* (2013.01); *C09B 67/0038* (2013.01); *Y10T 428/31678* (2015.04)

(58) Field of Classification Search
None
See application file for complete search history.

(56) References Cited

U.S. PATENT DOCUMENTS

| | | | |
|---|---|---|---|
| 6,143,418 A * | 11/2000 | Takamiya | H01B 1/02 428/434 |
| 6,572,940 B1 * | 6/2003 | Noethe | C03C 17/36 204/192.1 |
| 2009/0020215 A1 * | 1/2009 | Hood | B32B 17/10018 156/151 |
| 2009/0202930 A1 * | 8/2009 | Furukawa | C09B 67/0038 430/105 |

(Continued)

FOREIGN PATENT DOCUMENTS

| | | |
|---|---|---|
| CN | 101292362 A | 10/2008 |
| CN | 102421600 A | 4/2012 |

(Continued)

OTHER PUBLICATIONS

Taiwan Patent Office action dated Jul. 21, 2015 in corresponding Application No. 103136021, with English translation, 9 pages.

(Continued)

*Primary Examiner* — Callie E Shosho
*Assistant Examiner* — Daniel D Lowrey
(74) *Attorney, Agent, or Firm* — Lewis Roca Rothgerber Christie LLP (57) ABSTRACT

A transparent conductor includes a base layer, and a conductive layer on an upper surface of the base layer. The conductive layer includes metal nanowires and a matrix. The transparent conductor has a reflective a* value of about −0.3 to about +0.3 and a reflective b* value of about −2 to about 0. The transparent conductor exhibits good optical properties and prevents (or reduces) visibility of the etching pattern of the conductive layer.

11 Claims, 3 Drawing Sheets

(56) References Cited

U.S. PATENT DOCUMENTS

| | | | |
|---|---|---|---|
| 2011/0204767 A1* | 8/2011 | Jung | G02B 5/3025 |
| | | | 313/498 |
| 2011/0285019 A1 | 11/2011 | Alden et al. | |
| 2012/0118617 A1 | 5/2012 | Bories-Azeau et al. | |
| 2013/0129465 A1 | 5/2013 | Okazaki et al. | |
| 2014/0008115 A1 | 1/2014 | Sato et al. | |
| 2015/0036276 A1 | 2/2015 | Kaneko et al. | |

FOREIGN PATENT DOCUMENTS

| | | |
|---|---|---|
| KR | 10-2012-0053724 | 5/2012 |
| TW | 201244933 A | 11/2012 |
| WO | WO 2012/002332 A1 | 1/2012 |
| WO | WO 2012/133367 * | 10/2012 |
| WO | WO 2013/133285 A1 | 9/2013 |

OTHER PUBLICATIONS

SIPO Office action dated Mar. 25, 2016, issued in corresponding CN Application No. 201410554093.2, 8 pages.

* cited by examiner

TRANSPARENT CONDUCTOR AND OPTICAL DISPLAY INCLUDING THE SAME

CROSS-REFERENCE TO RELATED APPLICATION

This application claims priority to and the benefit of Korean Patent Application No. 10-2013-0124260, filed on Oct. 17, 2013, in the Korea Intellectual Property Office, the entire content of which is incorporated herein by reference.

BACKGROUND

1. Technical Field

One or more embodiments of the present invention are directed toward a transparent conductor and an optical display including the same.

2. Description of the Related Art

Transparent conductors are utilized in a variety of applications, for example, in touchscreen panels included in displays, flexible displays, and the like, and have been actively studied in recent years. In order to be suitable for flexible displays, transparent conductors should not only exhibit good transparency, sheet resistance, and the like, but also have flexural properties. However, while transparent conductors including metal nanowires may have good flexural properties, they also can have high transmissive b* values (based on the CIE Lab color difference formula), and thus can experience color distortion and deteriorated optical properties such as transmittance, haze, and the like.

SUMMARY

A transparent conductor according to embodiments of the present invention is capable of preventing (or reducing) pattern visibility of a conductive layer pattern.

The transparent conductor according to embodiments of the present invention is also capable of preventing (or reducing) the phenomenon in which the conductive layer looks yellow.

In accordance with some embodiments of the present invention, a transparent conductor includes a base layer, and a conductive layer on the base layer, the conductive layer including metal nanowires and a matrix. The transparent conductor has a reflective a* value of about −0.3 to about +0.3.

In accordance with other embodiments of the present invention, an optical display includes the transparent conductor described above.

According to embodiments the present invention, the transparent conductor can prevent (or reduce) pattern visibility of the conductive layer pattern. In addition, the transparent conductor can prevent (or reduce) milkiness (a phenomenon in which the transparent conductor looks milky).

DETAILED DESCRIPTION

Embodiments of the present invention will be described with reference to the accompanying drawings. It should be understood that the present invention is not limited to the following embodiments and may be modified in different ways. In the drawings, elements that should be apparent to those of ordinary skill in the art are omitted for clarity. Like components are denoted by like reference numerals throughout the specification. As used herein, terms such as "upper side" and "lower side" are defined with reference to the accompanying drawings. Thus, it will be understood that the term "upper side" can be used interchangeably with the term "lower side". The term "(meth)acrylate" may refer to acrylates and/or methacrylates. Also, the term "room temperature" means temperature of about 20° C. to about 30° C., unless otherwise specified. Also, the term "substantially" is used herein as a term of approximation and not as a term of degree, and is intended to account for inherent deviations in measured or calculated values, as would be recognized by those of ordinary skill in the art. By way of example, the term "substantially invisible" means that if the pattern on the conductive layer is visible at all, only a negligible portion of the pattern is visible and only after extensive observation. In some embodiments, the pattern on the conductive layer may be completely invisible to the naked eye. Also, in the context of the present application, when a first element is referred to as being "on" a second element, it can be directly on the second element or be indirectly on the second element with one or more intervening elements therebetween. Expressions such as "at least one of" and "one of," when preceding a list of elements, modify the entire list of elements and do not modify the individual elements of the list. Further, the use of "may" when describing embodiments of the present invention refers to "one or more embodiments of the present invention."

Figure 1:
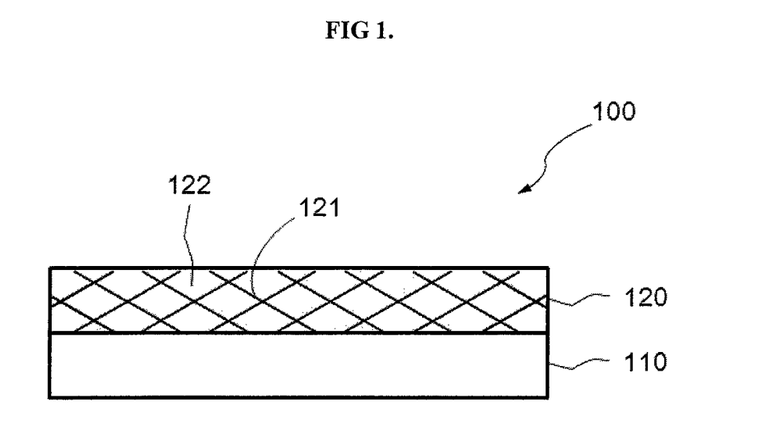
FIG. 1 is a schematic cross-sectional view of a transparent conductor according to some embodiments of the present invention.

Hereinafter, a transparent conductor according to some embodiments of the present invention will be described with reference to FIG. 1. FIG. 1 is a schematic cross-sectional view of a transparent conductor according to some embodiments of the present invention.

Referring to FIG. 1, a transparent conductor 100 may include a base layer 110 and a conductive layer 120 on the base layer 110, the conductive layer 120 including metal nanowires 121 and a matrix 122.

The transparent conductor 100 may have a reflective a* value of about −0.3 to about +0.3. Usually, in order to utilize the transparent conductor 100 as a transparent electrode film, the conductive layer 120 is formed to have a certain pattern, and the pattern of the conductive layer 120 can be visible due to a difference in color between the matrix 122 and the base layer 110. In contrast, according to embodiments of the present invention, when the transparent conductor 100 has a reflective a* value of about −0.3 to about +0.3, the pattern of the conductive layer 120 can be substantially invisible. In some embodiments of the present invention, the reflective a* value can be measured on the transparent conductor in which the conductive layer (having a thickness of about 50 nm to about 200 nm and including the nanowires and the matrix) is stacked on a polyethylene terephthalate base (having a thickness of about 10 μm to about 200 μm), at a visible light wavelength from 380 nm to 780 nm, using a colorimeter (such as CM-3600d produced by Konica Minolta Co., Ltd.) at room temperature, in accordance with DIN5033 Tei7, JIS Z 8722(condition c), ISO7724/1, CIE NO. 15 and ASTM E1164. However, the reflective a* value may fall within the above-described range even though the material and the thickness of the base layer, the thickness of the conductive layer, and/or the wavelength may be modified.

The base layer 110 may be a transparent film and may have a transmittance (e.g. a light transmittance) of about 85% to about 100%, and in some embodiments, about 90% to about 99%, at a wavelength of 550 nm and an index of refraction of about 1.50 to about 1.70. When the transmittance of the base layer is within any of these ranges, the transparent conductor 100 can exhibit improved optical properties. In some embodiments, the base layer may include one or more of a polyester film such as a polycarbonate, a cyclic olefin polymer, polyethylene terephthalate (PET), polyethylene naphthalate, or the like, a polyolefin film, a polysulfone film, a polyimide film, a silicone film, a polystyrene film, a polyacrylic film, and a polyvinyl chloride film, but the base layer is not limited thereto. The base layer 110 may have a structure in which at least two of the aforementioned resin films are stacked via an adhesive or the like. The base layer 110 may have a thickness of about 10 μm to about 200 μm, and in some embodiments, about 50 μm to about 150 μm. When the thickness of the base layer is within any of these ranges, the base layer can be suitable for use in displays.

The transparent conductor 100 may further include a functional layer on one or both surfaces of the base layer 110. The functional layer may include one or more of a hard coating layer, an anticorrosive layer, an anti-glare coating layer, an adhesion promoting layer, and an oligomer elution preventive (or reducing) layer, but the functional layer is not limited thereto.

In some embodiments, the conductive layer 120 may be formed on the base layer 110. The conductive layer 120 may include metal nanowires 121, a matrix 122, and a dye. The conductive layer 120 may be formed into an electrode by any suitable patterning method (e.g., etching or the like), and may have good conductivity, flexibility and flexural properties, and thus may be used for flexible devices.

When the conductive layer 120 includes the dye, the transparent conductor can realize a reflective a* value of about −0.3 to about +0.3. In some embodiments, the dye reduces the difference in color between the conductive layer 120 and the base layer 110 and cancels out (or substantially cancels out) the color of the matrix 122. Accordingly, when the transparent conductor can realize a reflective a* value of about −0.3 to about +0.3, pattern visibility of the conductive layer 120 can be reduced. The dye may be dispersed in the matrix 122.

The dye may include a mixture of a first dye having a maximum absorption wavelength of about 450 nm to about 550 nm and a second dye having a maximum absorption wavelength of about 350 nm to about 449 nm. When the dye includes the mixture of the first and second dyes, pattern visibility of the conductive layer can be further blocked (or reduced).

The mixture of the first and second dyes may be present in the conductive layer 120 in an amount of about 2% by weight (wt %) to about 12 wt %, and in some embodiments, about 4 wt % to about 8 wt %. When the amount of the first and second dyes is within any of these ranges, the transparent conductor can better block pattern visibility, while maintaining adhesion of the matrix to the metal nanowires. The first and second dyes may be selected from any suitable dyes so long as the dyes have maximum absorption wavelengths within the ranges according to embodiments of the present invention. The first and second dyes may each independently be a liquid or a solid and may include anthraquinone, acridine, diarylmethane, triarylmethane, an azo compound, a diazonium compound, quinone, rhodamine, and/or a fluorene-based chromophore, but the first and second dyes are not limited thereto. The first dye may be Y-300 (Yabang Chemical Group, China) and the second dye may be Y-82 (Yabang Chemical Group, China), but the first and second dyes are not limited thereto. In some embodiments, a weight ratio of the first dye to the second dye in the mixture of the first and second dyes may be about 1:0.5 to about 1:20, and in some embodiments, about 1:1 to about 1:19. When the weight ratio of the first dye to the second dye is within any of these ranges, the transparent conductor can better block pattern visibility.

In some embodiments, the matrix 122 includes a resin impregnated in the metal nanowires 121. The resin improves solvent resistance and adhesion of the conductive layer 120 to the base layer 110, and can protect the metal nanowires from oxidation, abrasion, and/or the like, by preventing (or reducing) exposure of the metal nanowires 121 to outside elements.

The matrix 122 may be formed from a matrix composition including the aforementioned mixture of the dyes, a binder, an initiator, and a solvent. The binder may include at least one of a monofunctional (meth)acrylate monomer and a polyfunctional (meth)acrylate monomer. The monomers may be urethane group-free mono- or poly-functional monomers, for example, bi-functional to hexa-functional monomers. Non-limiting examples of the monomers include linear or branched $C_1$ to $C_{20}$ alkyl group-containing (meth)acrylates, $C_1$ to $C_{20}$ alkyl group-containing (meth)acrylates having a hydroxyl group, $C_3$ to $C_{20}$ cycloaliphatic group-containing (meth)acrylates, polyfunctional (meth)acrylates of $C_3$ to $C_{20}$ polyhydric alcohols, and mixtures thereof. In some embodiments, the binder may include at least one of isobornyl (meth)acrylate, cyclopentyl (meth)acrylate, cyciohexyl (meth)acrylate, trimethylolpropane di(meth)acrylate, trimethylolpropane tri(meth)acrylate, ditrimethylolpropane tetra(meth)acrylate, pentaerythritol tri(meth)acrylate, pentaerythritol tetra(meth)acrylate, tris(2-hydroxyethyl)isocyanurate tri(meth)acrylate, glycerol tri(meth)acrylate, ethylene glycol di(meth)acrylate, neopentyl glycol di(meth)acrylate, hexanediol di(meth)acrylate, dipentaerythritol penta(meth)acrylate, dipentaerythritol hexa(meth)acrylate, and/or cyclodecane dimethanol di(meth)acrylate, but the binder is not limited thereto.

The initiator may be any suitable initiator, so long as the initiator can absorb light at a wavelength of about 150 nm to about 500 nm and can participate in (or initiate) a photoreaction. In some embodiments, the initiator may be 1-hydroxycyclohexyl phenyl ketone or a mixture including an α-hydroxy ketone initiator such as, for example, 1-hydroxycyclohexyl phenyl ketone.

The solvent may be any suitable solvent commonly used in connection with transparent conductors. In some embodiments, the solvent may include propylene glycol monomethyl ether.

In some embodiments, the matrix 122 may be formed from a matrix composition including about 5 wt % to about 8 wt % of the dye, about 87 wt % to about 93 wt % of the binder, and about 2 wt % to about 5 wt % of the initiator, in terms of solids content. When the matrix composition is within these ranges, the matrix 122 can be used as a matrix, and the resulting transparent conductor can have the desired reflective a* value and can exhibit improved transmittance. The matrix composition may further include additives that may improve the properties of the resulting matrix 122. The additives may include, without limitation, thickening agents, dispersants, adhesion promoters, and/or antioxidants.

In some embodiments, the matrix 122 may further include an inorganic material. The inorganic material may include, without limitation, silica, mullite, alumina, SiC, MgO—$Al_2O_3$—$SiO_2$, $Al_2O_3$—$SiO_2$, MgO—$Al_2O_3$—$SiO_2$—$Li_2O$, or a mixture thereof.

In some embodiments, the matrix 122 may further include a conductive polymer. The conductive polymer may include, without limitation, poly(3,4-ethylenedioxythiophene) (PEDOT), polyaniline, and/or polydiacetylene.

The metal nanowires 121 may form a conductive network as schematically shown in FIG. 1. When the metal nanowires 121 form a conductive network, the transparent conductor can have improved conductivity, as well as good flexibility and flexural properties. The metal nanowires 121 may be completely impregnated into the matrix 122 (e.g. may be entirely inside the matrix 122), or may be partially exposed on the surface of the conductive layer. In addition, metal nanowires can exhibit better dispersibility than metal nanoparticles, and thus can significantly reduce sheet resistance of the transparent conductor 100. The metal nanowires 121 may take the shape of an ultrafine wire having a specific cross-section. In some embodiments, a ratio of length (L) to cross-sectional diameter (d) of each of the metal nanowires 121 (aspect ratio L/d) may be about 10 to about 2,000. When the aspect ratio (L/d) of the metal nanowires 121 is within this range, the transparent conductor can have a highly conductive network, even when the concentration of the nanowires is low, and can exhibit reduced sheet resistance. In some embodiments, the metal nanowires may have an aspect ratio of about 500 to about 1,000, for example, about 500 to about 700. The metal nanowires 121 may have a cross-sectional diameter of about 100 nm or less. When the cross-sectional diameter of the metal nanowires 121 is within this range, the transparent conductor 100 and/or 150 can exhibit high conductivity and low sheet resistance due to a high aspect ratio (L/d). In some embodiments, the cross-sectional diameter of the metal nanowires 121 may be about 30 nm to about 100 nm, for example, about 60 nm to about 100 nm. The metal nanowires 121 may have a length (L) of about 20 μm or greater. When the length of the metal nanowires 121 is within this range, the transparent conductor can exhibit high conductivity and low sheet resistance due to a high aspect ratio (L/d). In some embodiments, the length of the metal nanowires 121 may be about 20 μm to about 50 μm. The metal nanowires 121 may include nanowires formed from any suitable metal. For example, the metal nanowires may include silver, copper, or gold nanowires, or a mixture thereof. In some embodiments, the metal nanowires are silver nanowires or a mixture including silver nanowires.

The metal nanowires 121 may be manufactured by any suitable method, or the metal nanowires may be commercially available. For example, the metal nanowires may be prepared by reduction of a metal salt (for example, silver nitrate ($AgNO_3$)) in the presence of a polyol and poly(vinyl pyrrolidone). In some embodiments, the metal nanowires may include a commercially available product, for example, ClearOhm® Ink, a metal nanowire-containing solution manufactured by Cambrios Technologies Corporation. The metal nanowires 121 may be present in the conductive layer in an amount of about 0.05 wt % to about 10 wt %, and in some embodiments, about 0.05 wt % to about 5 wt %, or about 0.1 wt % to about 5 wt %. When the amount of the metal nanowires 121 is within any of these ranges, the transparent conductor can have sufficient (or desired) conductivity and the metal nanowires can form the conductive network.

To improve coating of the metal nanowires 121 onto the base layer 110 and adhesion of the metal nanowires 121 to the base layer 110, the metal nanowires 121 can be dispersed in a liquid. Herein, the liquid composition in which the metal nanowires are dispersed is referred to as a "metal nanowire composition". The metal nanowire composition may include additives and a binder for dispersion of the metal nanowires. Non-limiting examples of the binder include carboxymethylcellulose (CMC), 2-hydroxyethylcellulose (HEC), hydroxypropyl methylcellulose (HPMC), methylcellulose (MC), polyvinyl alcohol (PVA), tripropylene glycol (TPG), polyvinylpyrrolidone, xanthan gum (XG), ethoxylates, alkoxylates, ethylene oxide, propylene oxide, and copolymers thereof.

The conductive layer 120 may have a thickness of about 50 nm to about 200 nm, and in some embodiments, about 70 nm to about 100 nm. When the thickness of the conductive layer 120 is within any of these ranges, the transparent conductor can have improved reliability and weather resistance and can prevent (or reduce the risk of) the coating layer from peeling away.

The transparent conductor 100 including the dye according to embodiments of the present invention can be substantially transparent in the visible light spectrum, for example, at a wavelength of about 400 nm to about 700 nm. In some embodiments, the transparent conductor 100 may have a haze of about 0% to about 1.4%, and in some embodiments, about 0.01% to about 1.4% (as measured at a wavelength of about 400 nm to about 700 nm using a haze meter), and a total transmittance of about 85% to about 100%, for example, about 90% to about 95%. Within any of these ranges, the transparent conductor 100 can have good transparency and can be used as a transparent conductor in displays. The transparent conductor 100 may have a sheet resistance of about 100Ω/□ or less, for example, about 50Ω/□ to about 100Ω/□, or about 30Ω/□ to about 100Ω/□, as measured using a 4-probe tester. When the sheet resistance of the transparent conductor is within any of these ranges, the transparent conductor can be used as an electrode film for touch panels due to low sheet resistance and can be applied to large-area touch panels.

In some embodiments, the transparent conductor 100 may have a reflective b* value of about −2.2 to about 0. Within this range, pattern visibility of the conductive layer 120 pattern can be reduced. The reflective b* value may be measured in a manner similar to the reflective a* value.

The transparent conductor 100 may have a thickness of about 10 μm to about 250 μm, and in some embodiments, about 50 μm to about 150 μm, without being limited thereto. When the thickness of the transparent conductor 100 is within any of these ranges, the transparent conductor can be used as a transparent electrode film for touch panels, including flexible touch panels. In some embodiments, the transparent conductor may be used as a transparent electrode film for touch panels, e-papers, and/or solar cells.

The transparent conductor 100 can be manufactured by coating the metal nanowire composition onto at least one surface of the base layer, and then drying the composition in an oven at about 60° C. to about 100° C. for about 1 minute to about 30 minutes. Next, the matrix composition may be coated onto the metal nanowires, dried in an oven at about 60° C. to about 100° C. for about 1 minute to about 30 minutes, and then cured by UV irradiation at about 300 mJ/cm$^2$ to about 1000 mJ/cm$^2$.

Figure 2:
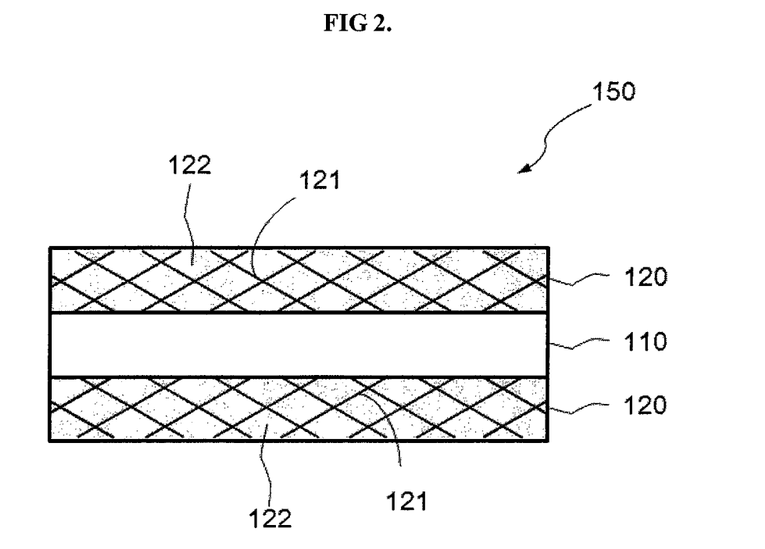
FIG. 2 is a schematic cross-sectional view of a transparent conductor according to some embodiments of the present invention.

Hereinafter, a transparent conductor according to embodiments of the present invention will be described with reference to FIG. 2. FIG. 2 is a schematic cross-sectional view of a transparent conductor according to other embodiments of the present invention.

Referring to FIG. 2, a transparent conductor 150 may include a base layer 110 and conductive layers 120 on both surfaces of the base layer 110, each conductive layer 120 including metal nanowires 121 and a matrix 122. The base layer 110 and the conductive layers 120 are substantially the same as those described above with respect to FIG. 1, except that the conductive layers 120 are formed on both surfaces of the base layer 110.

Hereinafter, a method for manufacturing a transparent conductor according to embodiments of the present invention will be described.

According to some embodiments of the present invention, the method for manufacturing a transparent conductor may include coating a metal nanowire composition onto a base layer to form a metal nanowire network layer, coating a matrix composition onto the metal nanowire network layer, and curing the matrix composition.

In some embodiments, the metal nanowire composition is a liquid composition in which metal nanowires are dispersed, and which may further include a binder for dispersion of the metal nanowires. In some embodiments, the metal nanowire composition is the same (or substantially the same) as described above with respect to the transparent conductor 100 shown in FIG. 1.

The metal nanowire composition may be coated onto the base layer using a coating method such as bar coating, spin coating, dip coating, roll coating, flow coating, or die coating, but the coating method is not limited thereto.

The metal nanowire composition coated onto the base layer can then be dried to form a metal nanowire network layer on the base layer. Drying may be performed, for example, at about 60° C. to about 100° C. for about 1 minute to about 30 minutes.

The matrix composition may include a mixture of dyes, a binder, an initiator, and a solvent. In some embodiments, the matrix composition is the same (or substantially the same) as described above with respect to the transparent conductor 100 shown in FIG. 1.

The matrix composition may be coated onto the metal nanowire network layer using a coating method such as bar coating, spin coating, dip coating, roll coating, flow coating, or die coating, but the coating method is not limited thereto. In some embodiments, the matrix composition coated onto the metal nanowire network layer permeates the metal nanowire network layer such that the metal nanowires are impregnated into the matrix composition. Accordingly, a conductive layer including the metal nanowires, the matrix, and the dyes can be formed. The metal nanowires may be completely impregnated into the matrix (e.g. may be entirely inside the matrix), or may be partially exposed on the surface of the conductive layer.

In embodiments of the present invention, formation of the metal nanowire network layer and formation of the matrix are performed as separate steps (e.g., forming the metal nanowire network layer is followed by coating the matrix composition including the dyes). Accordingly, the dyes included in the matrix do not disrupt (or interfere with) the contact between the individual metal nanowires, and increases in the sheet resistance of the transparent conductor can be prevented (or reduced).

In some embodiments, the method for manufacturing a transparent conductor may further include drying the matrix composition after coating the matrix composition and before curing the matrix composition. For example, the matrix composition may be dried at about 60° C. to about 100° C. for about 1 minute to about 30 minutes.

Curing of the matrix composition may be performed by at least one of photocuring and thermal curing. Photocuring may be performed by irradiating light having a wavelength of about 400 nm or less at an intensity of about 300 mJ/cm$^2$ to about 1000 mJ/cm$^2$, and thermal curing may be performed at about 50° C. to about 200° C. for about 1 hour to about 120 hours.

Figure 3:
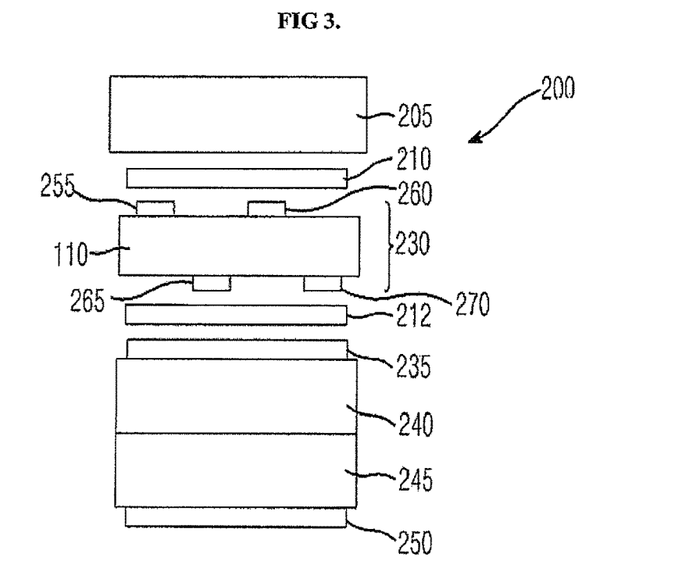
FIG. 3 is a schematic cross-sectional view of an optical display according to some embodiments of the present invention.
Figure 4:
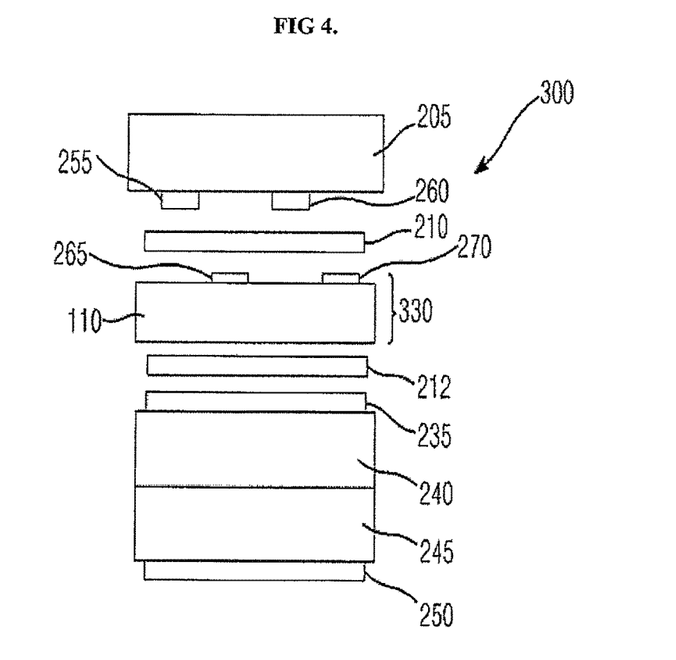
FIG. 4 is a schematic cross-sectional view of an optical display according to some embodiments of the present invention.
Figure 5:
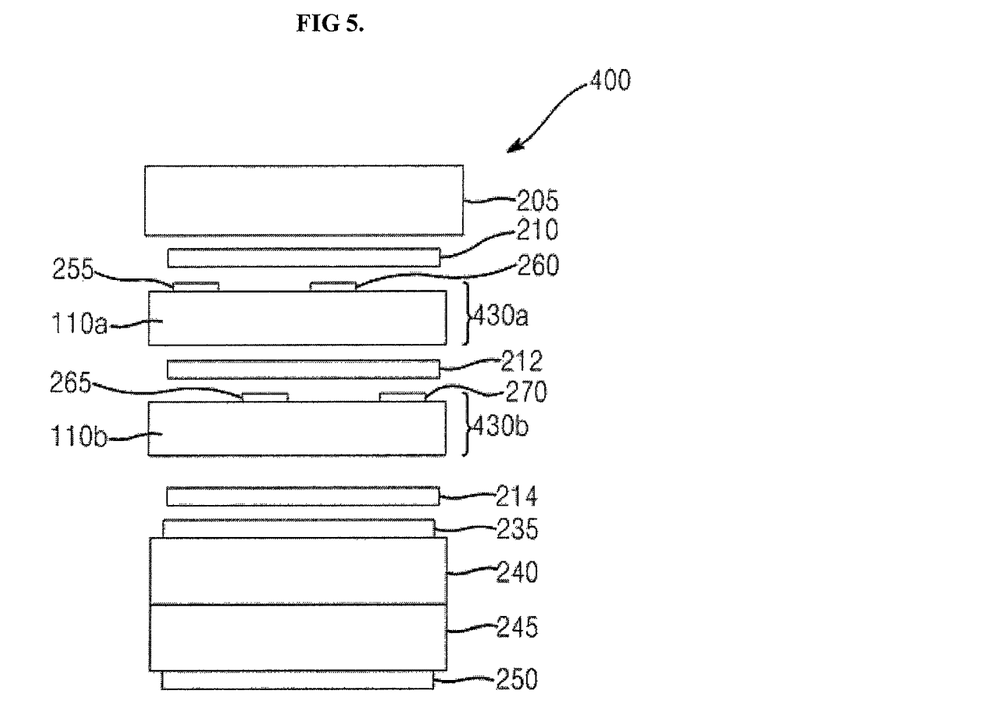
FIG. 5 is a schematic cross-sectional view of an optical display according to some embodiments of the present invention.

Hereinafter, optical displays according to embodiments of the present invention will be described with reference to FIGS. 3 to 5. FIGS. 3 to 5 are each a schematic cross-sectional view of an optical display according to some embodiments of the present invention. According to embodiments of the invention, the aforementioned transparent conductor can be utilized in various displays including, but not limited to, optical displays such as touch panels, touchscreen panels, flexible displays, and the like; e-papers; and solar cells.

Referring to FIG. 3, an optical display 200 may include: a transparent electrode structure 230 including a base layer 110, first and second electrodes 255, 260 on an upper surface of the base layer 110, and third and fourth electrodes 265, 270 on a lower surface of the base layer 110; a window 205 above the first and second electrodes 255, 260; a first polarizing plate 235 below the third and fourth electrodes 265, 270; a color filter (CF) 240 on a lower surface of the first polarizing plate 235; a panel 245 on a lower surface of the CF 240 and including a thin film transistor (TFT); and a second polarizing plate 250 on a lower surface of the panel 245 and including the TFT.

In some embodiments, the transparent electrode structure 230 is manufactured by patterning the conductive layer 120 of the transparent conductor 150 of FIG. 2 using any suitable method (for example, etching and/or the like) to form the first, second, third and fourth electrodes. When the transparent electrode structure 230 includes the matrix 122 according to embodiments of the present invention, the transparent electrode structure 230 can exhibit improved optical properties.

The first and second electrodes 255, 260 may be receiver electrodes (Rx electrodes) and the third and fourth electrodes 265, 270 may be transmitter electrodes (Tx electrodes), or vice versa.

The window 205 may be a screen display in the optical display and may be formed from any suitable glass material or transparent plastic film commonly used in connection with optical displays. The first and second polarizing plates 235, 250 can polarize external or internal light and may impart polarization capabilities to the optical display. In addition, the first and second polarizing plates 235, 250 may include a polarizer or a stacked structure including the polarizer and a protective film. The polarizer and the protective film may be any suitable polarizer and protective film, respectively, commonly used in connection with optical displays.

In some embodiments, adhesive films 210, 212 may be positioned between the window 205 and the transparent electrode structure 230 and between the transparent electrode structure 230 and the first polarizing plate 235, respectively, to facilitate bonding between the transparent electrode structure 230, the window 205, and the first polarizing plate 235. The adhesive films 210, 212 may be any suitable adhesive films and may include, for example, an optical clear adhesive (OCA) film.

According to other embodiments of the invention, the optical display 200 according to FIG. 3 may comprise a polarizing plate formed between the window 205 and the transparent electrode structure 230, and the first polarizing plate 235 and the second polarizing plate 250 are omitted.

Referring to FIG. 4, an optical display 300 may include: a transparent electrode structure 330 including a base layer 110 and third and fourth electrodes 265, 270 on an upper surface of the base layer 110; a window 205 above the third and fourth electrodes 265, 270 and including first and second electrodes 255, 260 on a lower surface of the window 205; a first polarizing plate 235 below the transparent electrode structure 330; a color filter (CF) 240 on a lower surface of the first polarizing plate 235; a panel 245 on a lower surface of the CF 240 and including a thin film transistor (TFT); and a second polarizing plate 250 on a lower surface of the panel 245 and including the TFT.

In some embodiments, the transparent electrode structure 330 is manufactured by patterning the conductive layer 120 of the transparent conductor 100 of FIG. 1 using any suitable method to form the third and fourth electrodes 265, 270. The transparent electrode structure 330 may further include the matrix 122 according to embodiments of the present invention. The resulting transparent electrode structure can exhibit improved optical properties and improved optical efficiency for light transmitted through the second polarizing plate 250, the panel 245 including the TFT, the CF 240, and the first polarizing plate 235. The first and second electrodes 255, 260 may be formed using any suitable electrode forming method.

In some embodiments, adhesive films 210, 212 may be positioned between the window 205 and the transparent electrode structure 330 and between the transparent electrode structure 330 and the first polarizing plate 235, respectively, thereby facilitating bonding between the transparent electrode structure, the window, and the first polarizing plate.

Referring to FIG. 5, an optical display 400 may include: a first transparent electrode structure 430a including a first base layer 110a, and first and second electrodes 255, 260 on an upper surface of the first base layer 110a; a second transparent electrode structure 430b below the first transparent electrode structure 430a and including a second base layer 110b and third and fourth electrodes 265, 270 on an upper surface of the second base layer 110b; a first polarizing plate 235 below the second transparent electrode structure 430b; a color filter (CF) 240 on a lower surface of the first polarizing plate 235; a thin film transistor (TFT) 245 on a lower surface of the CF 240; and a second polarizing plate 250 on a lower surface of the TFT 245.

The first and second transparent electrode structures 430a, 430b may each be manufactured by patterning the conductive layer 120 of the transparent conductor 100 of FIG. 1 using any suitable method to form the first, second, third and fourth electrodes. The first and second base layers 110a and 110b may form retardation films, and thus may compensate for viewing angle (e.g., may compensate for an angle at which a display is viewed). Accordingly, the transparent electrode structures 430a, 430b can compensate for viewing angle with respect to light transmitted through the second polarizing plate 250, the TFT 245, the CF 240, and the first polarizing plate 235.

In some embodiments, adhesive films 210, 212, 214 may be positioned between the first transparent electrode structure 430a and the window 205, between the first and second transparent electrode structures 430a, 430b, and between the second transparent electrode structure 430b and the first polarizing plate 235, respectively, thereby facilitating bonding between the respective transparent electrode structures, the window, and the first polarizing plate. The adhesive films 210, 212, 214 may be any suitable adhesive films and may include, for example, an optical clear adhesive (OCA) film.

In some embodiments, the base layer (or layers) shown in FIGS. 3 to 5 (e.g., the base layer 110 of FIGS. 3 and 4, respectively, and/or the first and second base layers 110a and 110b of FIG. 5) may each independently have a structure in which resin films are stacked via adhesives and/or the like.

Hereinafter, the present invention will be described with reference to certain examples. However, it should be understood that these examples are provided for illustration only and are not to be construed in any way as limiting embodiments of the present invention.

EXAMPLE 1

50 parts by weight of a metal nanowire-containing solution (i.e. a solution including a mixture of metal nanowires and a binder (having a weight ratio of metal nanowires to binder of 1:1.65), 1 wt % or less of a thickening agent, a dispersant or the like, and a solvent, (product name: ClearOhm® ink)) was added to 50 parts by weight of ultrapure distilled water, and the resulting solution was stirred, thereby preparing a metal nanowire composition. 0.5 parts by weight of SR506A (isobornyl acrylate, SARTOMER Co., Ltd., Japan), 0.5 parts by weight of trimethylol propane triacrylate (TMPTA, SK CYTEC Co., Ltd., Korea), 0.05 parts by weight of Irgacure-184 (1-hydroxy-cyclohexyl-phenyl-ketone, Ciba-Geigy Japan Ltd., Japan), 0.03 parts by weight of Y-300 (anthraquinone dye, Yabang Chemical Group, China) and 0.03 parts by weight of Y-82 (anthraquinone dye, maximum absorption wavelength of 427 nm, Yabang Chemical Group, China) were mixed with 99 parts by weight of propylene glycol monomethyl ether, thereby preparing a matrix composition. The metal nanowire composition was coated onto a hard-coated polyethylene terephthalate film (thickness: 100 μm, 100 CPB, KIMOTO Co., Ltd.) using a spin coater, and then dried in an oven at 80° C. for 2 minutes. Next, the matrix composition was coated onto the metal nanowire composition, dried in an oven at 140° C. for 2 minutes, and then UV-cured at 500 mJ/cm$^2$, thereby manufacturing a transparent conductor including a conductive layer having a thickness of about 70 nm to about 100 nm.

EXAMPLES 2 to 4

Transparent conductors for Examples 2 to 4 were each manufactured as in Example 1 except that the amount of Y-300 and Y-82 was changed for each transparent conductor as listed in Table 1.

COMPARATIVE EXAMPLE 1

A transparent conductor was manufactured as in Example 1 except that 0.5 parts by weight of SR506A, 0.5 parts by weight of TMPTA and 0.05 parts by weight of Irgacure-184 were used instead of Y-300 and Y-82.

COMPARATIVE EXAMPLE 2

A transparent conductor was manufactured as in Example 1 except that 0.06 parts by weight of Y-300 was used instead of using both Y-300 and Y-82.

COMPARATIVE EXAMPLE 3

A transparent conductor was manufactured as in Example 1 except that instead of using both Y-300 and Y-82, 0.06 parts by weight of Y-82 was used.

Evaluation

Each of the transparent conductors was evaluated as to the following properties, and the results are shown in Table 1.

(1) Sheet resistance ($\Omega/\square$): Sheet resistance for the surface of the transparent conductor was measured using a contact-type sheet resistance meter (R-CHEK RC2175, EDTM Inc.).

(2) Reflective b* and reflective a*: Reflective b* and reflective a* were measured on the transparent conductor using a Spectrophotometer CM-3600d (Konica Minolta Co., Ltd., in accordance with CIE Lab).

(3) Haze and Transmittance: The conductive layer of the transparent conductor was placed to face a light source, and haze and transmittance were measured at a wavelength of about 400 nm to about 700 nm using a haze meter (NDH-9000).

(4) Pattern visibility: The conductive layer of the transparent conductor was patterned by etching. As shown in Table 1, the transparent conductor was rated as "Poor" when patterned and non-patterned portions of the conductive layer were visible to the naked eye, "Improved" when the difference between the patterned and non-patterned portions was only slightly visible to the naked eye, and "Good" when the presence or absence of the pattern was visible to the naked eye only after detailed and extensive observation of the patterned and non-patterned portions.

Example 2 looked red (as compared with existing patterns), and the pattern of the conductive layer was visible to the naked eye. The transparent conductor of Comparative Example 3 included the second dye alone and had a reflective a* value of less than −0.3. Thus, the transparent conductor of Comparative Example 3 looked green (as compared with existing patterns), and the pattern of the conductive layer was visible to the naked eye.

While certain exemplary embodiments have been described, it is to be understood that the disclosure is not limited to the disclosed embodiments, but, on the contrary, is intended to cover various modifications, changes, alterations, and equivalent embodiments included within the spirit and scope of the appended claims and equivalents thereof.

What is claimed is:

1. A transparent conductor comprising:
    a base layer; and
    a conductive layer on the base layer, the conductive layer comprising metal nanowires and a matrix, the matrix comprising a mixture of a first dye having a maximum absorption wavelength of about 450 nm to about 550 nm and a second dye having a maximum absorption wavelength of about 350 nm to 449 nm,
    wherein the transparent conductor has a reflective a* value of about −0.3 to about +0.3.

2. The transparent conductor according to claim 1, wherein the transparent conductor has a reflective b* value of about −2 to about 0.

3. The transparent conductor according to claim 1, wherein each of the first and second dyes is an anthraquinone dye.

4. The transparent conductor according to claim 1, wherein a weight ratio of the first dye to the second dye is about 1:0.5 to about 1:20.

5. The transparent conductor according to claim 1, wherein the matrix is formed from a matrix composition comprising the mixture, a binder, and an initiator.

TABLE 1

| NO | Y-300 (parts by weight) | Y-82 (parts by weight) | Thickness of conductive layer (nm) | Sheet resistance ($\Omega/\square$) | Transmittance (%) | Haze (%) | Reflective b* | Reflective a* | Pattern visibility |
|---|---|---|---|---|---|---|---|---|---|
| Example 1 | 0.03 | 0.03 | 70~100 | 70~80 | 90.09 | 1.02 | −2.11 | 0.04 | Improved |
| Example 2 | 0.021 | 0.039 | 70~100 | 70~80 | 90.11 | 1.03 | −1.98 | −0.01 | Improved |
| Example 3 | 0.012 | 0.048 | 70~100 | 70~80 | 90.12 | 1.10 | −1.79 | −0.10 | Improved |
| Example 4 | 0.003 | 0.057 | 70~100 | 70~80 | 90.01 | 1.05 | −1.29 | −0.15 | Good |
| Comparative Example 1 | 0 | 0 | 70~100 | 70~80 | 91.45 | 0.98 | −2.42 | 0.31 | Poor |
| Comparative Example 2 | 0.06 | 0 | 70~100 | 70~80 | 90.96 | 1.02 | −1.77 | 0.31 | Poor |
| Comparative Example 3 | 0 | 0.06 | 70~100 | 70~80 | 91.32 | 1.09 | −2.39 | −0.32 | Poor |

As shown in Table 1, the transparent conductors according to embodiments of the present invention which included the mixture of the dyes had high transmittance and low haze, and thus exhibited good optical properties. In addition, the pattern of the conductive layer for each of the transparent conductors of Examples 1 to 4 was either substantially invisible or only slightly visible to the naked eye.

In contrast, the transparent conductor of Comparative Example 1 did not include the dyes, and the pattern of the conductive layer was clearly visible to the naked eye. The transparent conductor of Comparative Example 2 included the first dye alone and had a reflective a* value of greater than +0.3. Thus, the transparent conductor of Comparative 6. The transparent conductor according to claim 5, wherein the binder comprises a urethane group-free binder.

7. The transparent conductor according to claim 5, wherein the binder comprises a compound selected from the group consisting of $C_1$ to $C_{20}$ alkyl group-containing (meth)acrylates, $C_1$ to $C_{20}$ alkyl group-containing (meth)acrylates including a hydroxyl group, $C_3$ to $C_{20}$ cycloaliphatic group-containing (meth)acrylates, polyfunctional (meth)acrylates of a $C_3$ to $C_{20}$ polyhydric alcohol, and combinations thereof.

8. The transparent conductor according to claim 5, wherein the matrix composition comprises about 5 wt % to about 8 wt % of the mixture of the first dye and the second dye, about 87 wt % to about 93 wt % of the binder, and about 2 wt % to about 5 wt % of the initiator, in terms of solids content.

9. The transparent conductor according to claim 1, wherein the metal nanowires comprise silver nanowires.

10. The transparent conductor according to claim 1, further comprising at least one of a hard coating layer, an anticorrosive layer, an anti-glare coating layer, an adhesion promoting layer, or an oligomer elution preventive layer on an upper or lower surface of the base layer.

11. An optical display comprising the transparent conductor according to claim 1.

* * * * *